Figure 1:
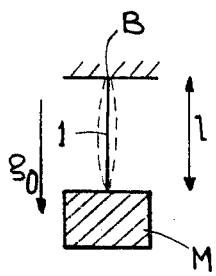

United States Patent

[11] 3,592,062

[72] Inventor Raymond Mathey
Paris, France
[21] Appl. No. 872,982
[22] Filed Oct. 31, 1969
[45] Patented July 13, 1971
[73] Assignee Thomson CSF
[32] Priority Nov. 22, 1968
[33] France
[31] 174,999

[54] VIBRATING STRINGS GRAVIMETER
3 Claims, 5 Drawing Figs.
[52] U.S. Cl. ..................................................... 73/382
[51] Int. Cl. ..................................................... G01v 7/16
[50] Field of Search ........................................... 73/382, 517 AV

[56] References Cited
UNITED STATES PATENTS
3,057,208 10/1962 Bedford.......................... 73/517 (AV)

*Primary Examiner*—James J. Gill
*Attorney*—Kurt Kelman

ABSTRACT: A vibrating strings gravimeter comprising a mass secured to a frame by two vertical strings having different characteristics, such as length. A mechanical tension is applied to these strings and is adjusted as a function of the mass and of these characteristics for minimizing the effect of parasitic alternating acceleration on the measure of the gravitational acceleration.

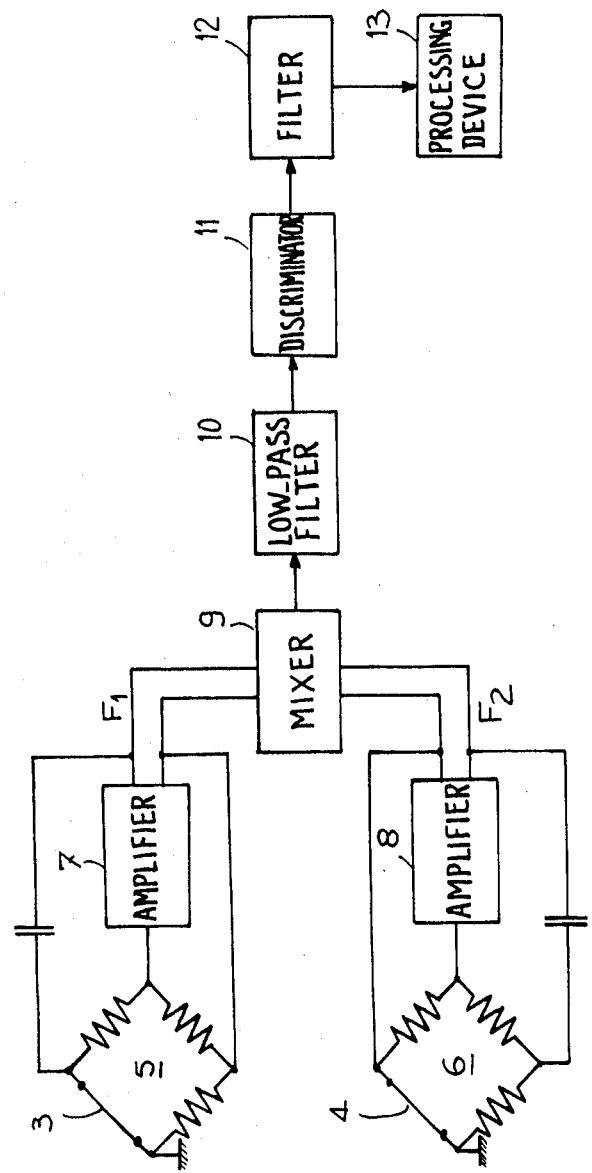

VIBRATING STRINGS GRAVIMETER

The present invention relates to vibrating string gravimeters.

In situations where, for example, for the purpose of submarine geological prospecting, it is necessary to employ a gravimeter on board a ship, the latter is subject not only to the acceleration due to gravity but also to alternating parasitic accelerations arising from the movements of the ship. These latter can reach maximum amplitudes of around 0.1 g. and result in errors in the measurement of the gravitational acceleration, due to the fact that the law of variation of the frequency of vibration of strings, as a function of the vertical acceleration applied, is not linear but parabolic.

This nonlinearity of conventional gravimeters leads to errors which are not compatible with the degree of precision required in prospecting.

One solution has been proposed which consists, using a gravimeter with two vibrating strings of the same length, in making the sum of the frequencies of vibration of the two strings constant, for example by heating the strings; however this approach introduces major complications into the apparatus.

Another solution consists in correcting the errors due to the nonlinearity of the apparatus, by means of a computer which makes the requisite corrections in the results. However, this solution is also complicated and expensive.

It is an object of this invention to remedy these drawbacks.

According to the invention, there is provided a vibrating string gravimeter comprising: a frame; an inert mass; two vertical strings differing from one another by at least one characteristic and having respectively first and second ends, said first ends being respectively fixed to opposite faces of said mass and said second ends to said frame, said strings extending in opposite direction with respect to said mass; means for applying to said strings a mechanical tension; means for maintaining each of said strings in vibration at a frequency equal to the fundamental frequency thereof; measuring means for measuring the difference between said fundamental frequencies of said strings; and adjusting means for adjusting, in the absence of action of the gravity, the mean value $T_o$ of said mechanical tension as a function of said characteristics and of the value of said mass for substantially cancelling the error on the mean value of said frequency difference, due to any parasitic vertical alternating acceleration applied to said mass.

Figure 2:
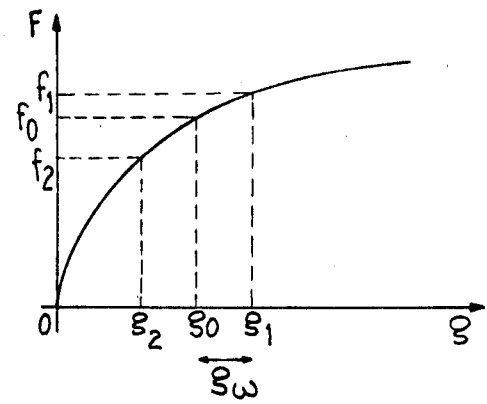
Figure 4:
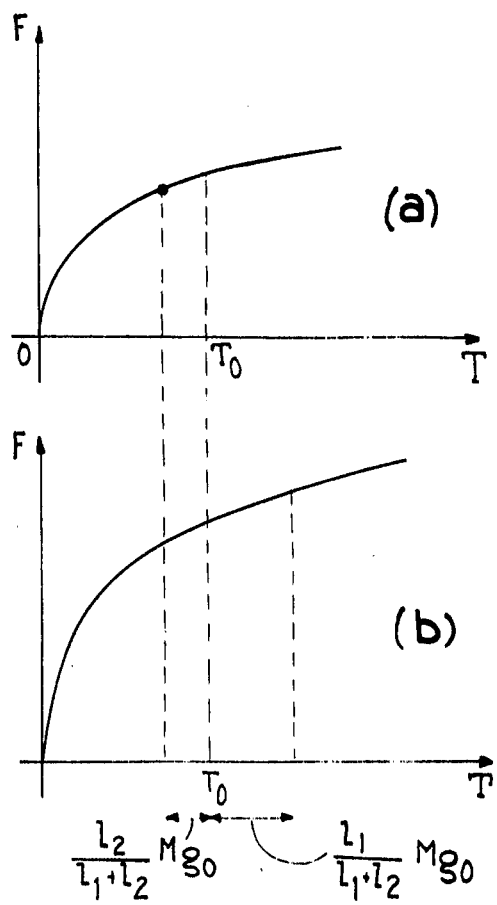

For a better understanding of the invention and to show how the same may be carried into effect reference will be made to the drawings accompanying the ensuing description and in which:

FIG. 1 schematically illustrates a conventional single-string gravimeter;

FIG. 2 illustrates the curve of vibration frequency variation of this string, as a function of the applied vertical acceleration;

FIGS. 3(a) and (b) illustrate a gravimeter according to the invention;

FIGS. 4(a) and (b) are explanatory curves; and

FIG. 5 illustrates a circuit associated with a gravimeter in accordance with the invention.

In FIG. 1, a gravimeter with a single-vibrating string 1 has been schematically illustrated. The string is vertical and has a length $l$. It is fixed at B at one end and carries at its other end a mass $M$. When this gravimeter is subjected to the effect of an acceleration due to gravity $g_o$ alone, the fundamental frequency of vibration of the string 1 is given by the well-known relationship:

$$f_0 = \frac{1}{2l}\sqrt{\frac{Mg_0}{\rho \cdot s}}$$

where $\rho$ is the specific mass of the string material and $s$ its cross-sectional area.

The curve of FIG. 2 illustrates the variations of this frequency as a function of the acceleration $g$. This curve is a portion of a parabola.

If the gravimeter is moreover subjected to an alternating vertical acceleration of amplitude $g_\omega$, due for example to movements on the part of the vehicle in which the gravimeter is placed, then the frequency of vibration of the string becomes:

$$F_\omega = A\sqrt{g_0 + g_\omega \sin \omega t}$$

it being assumed that the alternating variations in acceleration are sinusoidal with an angular frequency $\omega$.

Because of the nonlinearity of the curve shown in FIG. 2, for equal variations in acceleration to either side of $g_o$, the corresponding frequency variations are not equal and the mean value of the frequency of vibration of the string is not equal to $f_o$. Calculation shows that the relative error produced in the measurement of the gravity acceleration is, disregarding terms of an order higher than two:

$$\frac{\Delta g_0}{g_0} = -\frac{1}{8}\left(\frac{g_\omega}{g_0}\right)^2$$

For an alternating acceleration $g_\omega$ equal to 0.1 $g_o$ (this is a maximum likely to be encountered on board a ship, for example), this means an error $\Delta g_o$ in the order of 1,200 milligals, while a degree of accuracy in the order of 1 milligal or even one-tenth of a milligal is what is required.

Figure 3:
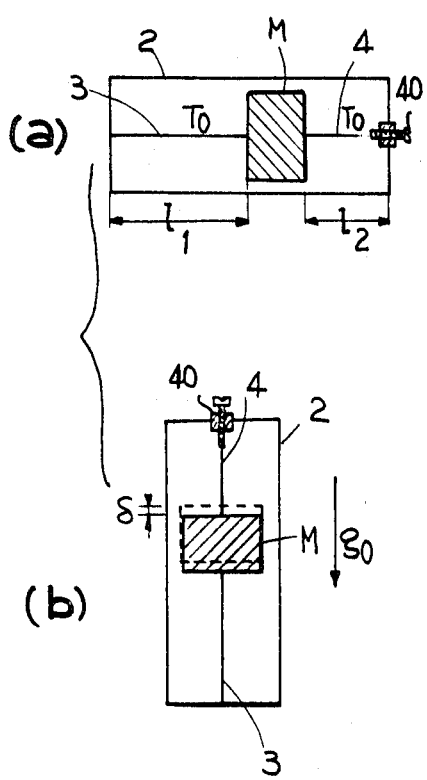

FIG. 3 shows diagrammatically a gravimeter in accordance with the invention. It comprises a mass $M$ secured to a frame 2 by means of two vibrating strings 3 and 4 having identical characteristics but different lengths $l_1$ and $l_2$.

In the operating position, the strings 3 and 4 are vertical (FIG. 3b) the shorter string being the top one.

Moreover, in accordance with the invention a mechanical tension is applied to the strings by means of a device 40, shown schematically in FIG. 3 as an adjusting screw. The mean tension is equal to $T_o$ in the absence of any action of the gravity, and this is schematically indicated by illustrating the gravimeter in a horizontal attitude in FIG. 3a.

If $k_1$ and $k_2$ are the respective stiffnesses of the strings 3 and 4, one has the relationship:

$$k_1 l_1 = k_2 l_2.$$

If the gravimeter is subjected to gravitational acceleration $g_o$ which it is desired to measure (FIG. 3b), then the strings 3 and 4 undergo an extension $\delta$ such that:

$$\delta = \frac{Mg_0}{k_1 + k_2}$$

and are respectively subjected to tensile stresses:

$$T_1 = T_0 - \frac{l_2}{l_1 + l_2} Mg_0$$

$$T_2 = T_0 + \frac{l_1}{l_1 + l_2} Mg_0$$

and this is illustrated in the curves of FIGS. 3(a) and 3(b) which respectively show the variations in the frequency of the vibration of the strings 3 and 4, as a function of the applied vertical acceleration.

The frequencies of vibration of the strings 3 and 4 are respectively given by $$F_1 = \frac{\beta}{l_1}\sqrt{T_0 - \frac{M\delta_0}{1+\mu}}$$

$$F_2 = \frac{\beta}{l_2}\sqrt{T_0 + \frac{\mu}{1+\mu} Mg_0},$$

where $\beta$ is a constant and $\mu$ is equal to $\frac{l_1}{l_2}$.

The measurement of the gravitational acceleration $g_o$ is derived from the measuring of the frequency difference $F_2 - F_1$.

First it may be noted that it is intuitively apparent from FIGS. 4a and 4b, that a certain degree of compensation of errors due to the nonlinearity of the frequency vs. acceleration curve, in the presence of alternating parasitic vertical accelerations, may be achieved by using these curves, since the working points are such that the effects of the differing curvatures of the two curves compensate one another. In a similar way it is apparent that such errors will be amplified, if the upper string is the longer.

In accordance with the invention, the errors due to nonlinearity of the frequency vs. acceleration relationship are compensated to the best possible extent by so selecting the initial tension $T_o$ and the ratio $\mu$ of the lengths $l_1$ and $l_2$ that the mean value of the frequency difference $F_2-F_1$ is as near as possible constant when there is applied to the gravimeter a vertical alternating acceleration of amplitude $g_\omega$.

More particularly, disregarding the terms of an order higher than three of the expansion of:

$$F_2-F_1 = \frac{\beta\sqrt{T_0}}{l_2}\sqrt{1+\frac{\mu}{1+\mu}\epsilon\left(1+\frac{g_\omega}{g_0}\sin\omega t\right)}$$

$$\frac{\beta\sqrt{T_0}}{l_1}\sqrt{1-\frac{\epsilon}{1+\mu}\left(1+\frac{g_\omega}{g_0}\sin\omega t\right)}$$

where $\epsilon = Mg_o/T_o$, the tension $T_o$ and the ratio of the lengths $l_1$ and $l_2$ are so selected that:

$$\epsilon = \frac{2}{3}(\mu^3-1)\frac{1+\mu}{1+\mu^4}$$

which has the effect of cancelling out the mean value of all the alternating terms up to the third order term, which are contained in the frequency difference $F_2-F_1$.

The only residual error, which is due to the nonlinearity then comes from the higher order terms and essentially from the fourth order terms.

For an alternating acceleration of 0.1 $g_o$, by selecting $\epsilon = 0.255$, this giving an appropriate value for the mass $M$ and the tension $T_o$ and meaning that $\mu = 1.14$, the error is in the order of 0.5 milligal.

In FIG. 5, an example of a circuit associated with the gravimeter has been illustrated.

Each string is set into vibration at its fundamental resonance frequency, by means of a conventional circuit. To this end, the strings 3 and 4 are arranged in resistance bridges 5 and 6 respectively and within the field of a permanent magnet (not shown). Two opposite apices of the bridges are respectively connected to the inputs of amplifiers 7 and 8 and the two remaining apices to the output of the corresponding amplifier which operates as a self-oscillating circuit continually tuned to the vibration frequency of the corresponding string.

A mixer 9 is connected to the outputs of the amplifiers 7 and 8 and supplies beat frequency signals $F_2-F_1$, $F_1+F_2$, etc. A low-pass filter 10 filters the frequency $F_2-F_1$ and thus eliminates the higher beat frequencies.

The frequency $F_2-F_1$ varies as a function of the magnitude of the gravitational acceleration, and the signal obtained can be regarded as a signal frequency modulated around the mean frequency $F_o$ corresponding to the mean value $g_o$ of the gravitational acceleration. This signal is supplied to a frequency discriminator 11 centered on the frequency $F_o$ and followed by a filter 12 which eliminates variations due to any parasitic alternating acceleration, retaining only the mean value of the frequency $F_2-F_1$ which is a measure of the gravitational acceleration.

The resultant signal is recorded or used in any suitable processing device 13.

It is also possible to process the signal from the gravimeter in digital fashion, for example using a differential digital analyzer.

The gravimeter in accordance with the invention can be equipped with all the improvements which enable drifts to be cancelled, the movements of the mass $M$ to be damped, the effects of transverse acceleration to be minimized, etc., as described, for example, in French Pat. No. 1,536,427 issued to the applicant.

Of course, the invention is not limited to the embodiment described and shown which was given solely by way of example. In particular, the two strings, instead of having the same cross sections, can have different cross-sectional areas and their respective lengths being adjusted accordingly.

What I claim is:

1. A vibrating string gravimeter comprising: a frame; an inert mass; two vertical strings differing from one another by at least one physical characteristic that affects their natural frequencies and having respectively first and second ends, said first ends being respectively fixed to opposite faces of said mass and said second ends to said frame, said strings extending in opposite direction with respect to said mass; means for applying to said strings a mechanical tension; means for maintaining each of said strings in vibration at a frequency equal to the fundamental frequency thereof; measuring means for measuring the difference between said fundamental frequencies of said strings; and adjusting means for adjusting, in the absence of the force of gravity, the mean value $T_o$ of said mechanical tension as a function of said differing physical characteristics and of the value of said mass for substantially cancelling the error on the mean value of said frequency difference, due to any parasitic vertical alternating acceleration applied to said mass.

2. A gravimeter as claimed in claim 1, wherein said characteristic, which differs from one of said strings to the other, is the length and the shortest of said strings is above the other in operation.

3. A gravimeter as claimed in claim 2, wherein said strings have identical mechanical and electrical characteristics other than length and said adjusting means adjust said mean value $T_o$ according to the relation $\epsilon = 2/3(\mu^3-1)(1+\mu/(1+\mu^4))$, where $\epsilon$ is equal to the ratio $Mg_o/T_o$, $M$ is the value of said mass, $g_o$ the value of the gravity and $\mu$ is the ratio between the lengths respectively of the longest and of the shortest string.